UNITED STATES PATENT OFFICE.

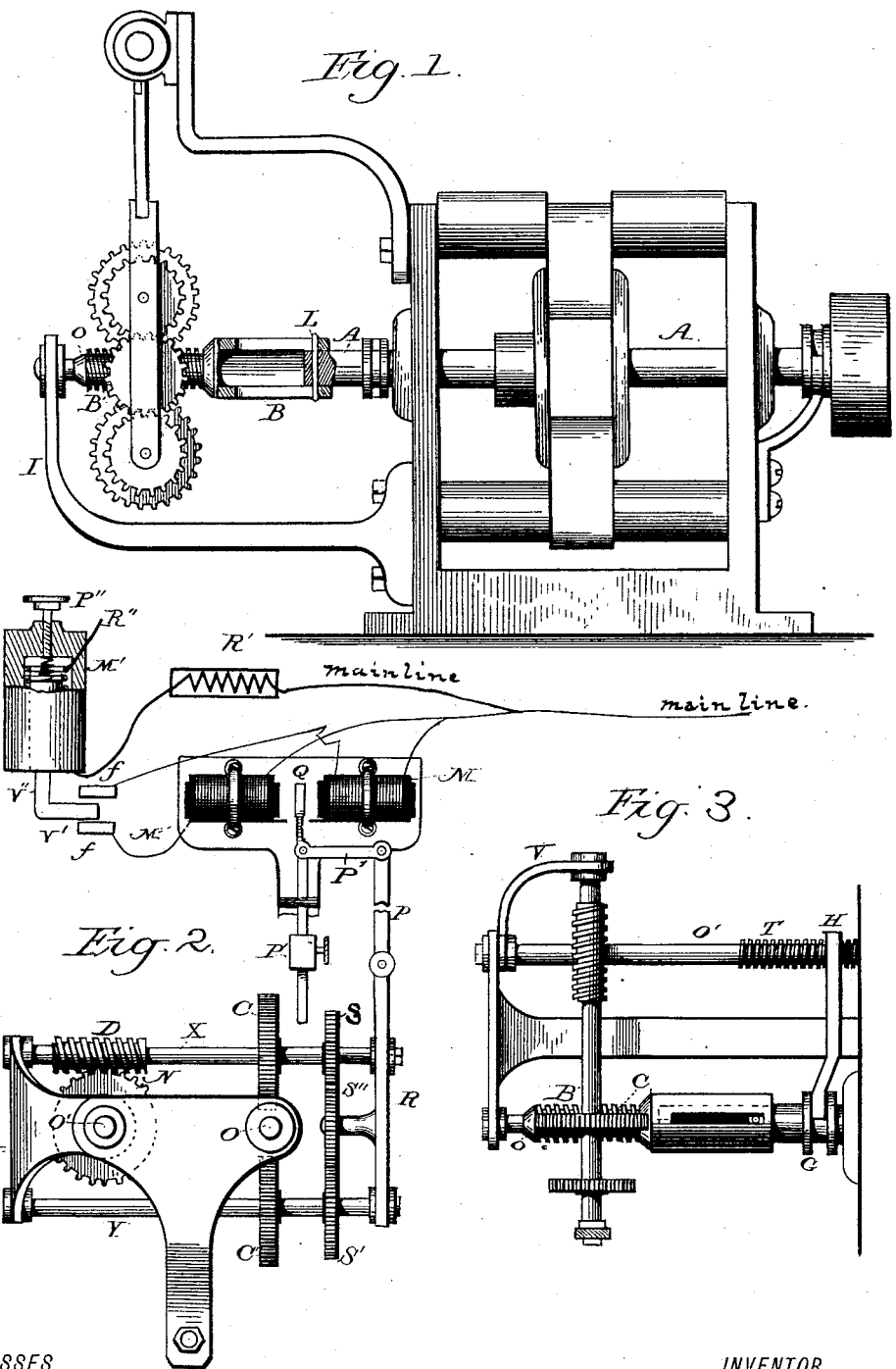

EDWIN PLACE, OF CHICAGO, ILLINOIS.

REGULATOR FOR DYNAMO-ELECTRIC MACHINES.

SPECIFICATION forming part of Letters Patent No. 369,655, dated September 6, 1887.

Application filed June 2, 1885. Serial No. 167,418. (No model.)

*To all whom it may concern:*

Be it known that I, EDWIN PLACE, a citizen of the United States, residing at Chicago, in the county of Cook and State of Illinois, have invented certain new and useful Improvements in Automatic Regulators for Dynamo-Electric Machines, of which the following is a specification, reference being had to the accompanying drawings.

The object of my invention is to furnish means whereby a constant current may be maintained in the external circuit of a dynamo-electric machine regardless of variations in the amount of work interposed in such circuit, the effective magnetic force acting upon the rotating armatures being automatically increased or diminished, as the particular conditions require, to correspond with varying resistances on the line.

To this end the invention consists, broadly, in interposing in the circuit of the machine a device which remains inactive during the passage of the normal current, but which upon increase or decrease thereof actuates or brings into operation means for shifting the shaft and its armature outwardly or inwardly from the field-magnets, thereby restoring the original current. The current being generated in the rotating armature, it is evident that the shifting of the latter toward or from the field-magnets will produce corresponding variations in the electro-motive force of the machine and in the amount of current supplied to the external circuit.

Referring to the accompanying drawings, illustrative of my invention, and in which like letters indicate like parts, Figure 1 represents a side elevation of my invention, part thereof being shown in section. Fig. 2 represents an end elevation of the same, also partly in section; and Fig. 3 represents a plan, some of the parts being removed to better illustrate the arrangement of the remainder.

A indicates the shaft of a dynamo-electric machine, said shaft bearing a fixed armature and rotating in bearings mounted within the machine frame-work. At one of its extremities it engages, by means of a fixed pin, L, with a slotted sleeve-extension, B, having its outer support in the extremity of the curved bearing T-arm I, bolted to the frame. The sleeve-shaft O is provided with the worm-screw B'.

Parallel with the shaft O is located the shaft O', having bearings in the frame and arm I. The shaft O' is provided with the fixed gear-wheel N and the worm-screw T. The latter engages with the traveling nut H, which has an arm-extension whose free end enters the groove of a fixed collar, G, located upon the dynamo shaft.

Upon the shaft O' and at its outer extremity is mounted the arm V, turning loosely upon the shaft. The arm V bears two transverse shafts, X and Y, arranged on opposite sides of the shafts O O'. The shafts X and Y have their opposite bearings in a yoke, R, and are provided with fixed pinions S S', intermeshing with an intermediate idle-pinion, S'', located upon a spur projecting from the yoke. They are also provided with fixed pinions C C', located opposite the worm screw B, and at such distance therefrom that but one of them can be in gear with the screw at a time.

The shaft X is provided with a worm-screw, D, intermeshing constantly with the gear-wheel N upon the shaft O'. The whole construction is such that the arm V and yoke R, with their shafts and pinions, are capable of a slight vertical oscillation upon the shaft O' as a center in such manner as to cause either the pinion C or C' to gear with the screw B.

The yoke R is connected at its upper extremity with the lower end of a link, P, of a bell-crank lever, P', pivoted to a base-plate which supports electro-magnets M M. Above the pivotal point the lever bears an armature, Q, interposed between the opposing poles of the magnets, and held midway between them by means of the dependent arm and pendulum-weight P' when the magnet-cores are not energized. One of the extremities of each coil is connected with a branch line from the dynamo, the other extremities being connected, respectively, with one of two opposite contact-pieces, $f\,f$. The latter are located opposite the tongue V' of the vertically-movable core V'' of a solenoid, M', whose coil is connected with the main line through a resistance, R', equal in value to the resistance of one of the magnet-coils and wire R''. The object of the resistance-coil is primarily to throw the current through the branch circuit containing one of the magnet-coils M when contact is made by tongue V'. The resistance-coil is never out of circuit. The tongue V' is to be connected to circuit by a positive contact through some flexible conductor in such a manner that there shall be an invariable contact, so that the contacts between tongue and main circuit shall not be affected by the motion of the solenoid-core. The adjustment of the solenoid-core is effected by means of a screw and spring, P''.

The parts being arranged as described, the operation of my invention is as follows: The core V'' is so adjusted that during the passage of the normal current from the dynamo the tongue V' will remain midway between the contact-pieces $f\,f$. Suppose, now, the current to increase from any cause. The core will be raised immediately and the tongue V' brought into electrical connection with the upper one of the two contact-pieces. The right-hand magnet-coil will accordingly be energized and the armature Q attracted toward it. The link P will be depressed and the system, comprising the yoke R and arm V, with their shafts X Y and pinions, will be rotated upon the shaft O' toward the right. The pinion C thereupon will engage with the worm-screw B upon the shaft O, and the shaft X will be set in motion. This motion will be transmitted by worm-gear D and gear-wheel pinion N to the shaft O'. The rotation of the latter will cause the nut H to traverse the screw T away from the frame-work of the machine, and the arm-extension of such nut will draw the dynamo-shaft A outwardly, forcing it within the sleeve B and carrying its armature a corresponding distance from the field-magnets. As a result, the electro-motive force of the machine will be continuously diminished until the re-establishment of the normal current, whereupon the solenoid-core will return to its original position of adjustment and longitudinal movement of the dynamo-shaft will cease, the contact at $f$ being broken. A drop in the strength of the current will be attended with analogous results, the movement of the various parts being the converse of that above described, and the armature being caused to approach the field-magnets until equilibrium is established.

Having thus described my invention, what I claim, and desire to secure by Letters Patent, is—

1. In a dynamo-electric machine, an armature-shaft capable of a longitudinal movement in its bearings, in combination with a shifter, having gearing normally out of mesh with the shaft-gear, but automatically thrown into mesh therewith by changes in condition of the current of the machine, whereby the power for effecting longitudinal movement is supplied from the shaft itself, substantially as described.

2. In an dynamo-electric machine, the combination, with the longitudinal movable armature shaft, of a shifter shaft bearing a traveling shifting-arm, rocking frame-work mounted loosely upon the shifter-shaft and bearing gearing intermediate between the two shafts, but normally out of mesh with the former, and a governor actuated by changes in the condition of the current of the machine to throw said gearing into action, substantially as shown and described.

3. In a dynamo-electric machine, the combination, with the longitudinal movable armature-shaft A, bearing the grooved collar G and pin $l$, of the slotted extension-sleeve B and its worm-shaft O, the parallel worm-shaft O', having the gear-pinion N, traveling nut H, the transverse shafts X Y, mounted in an oscillating frame and provided with pinions C C' S S' and worm-screw D, the idle pinion S'', and the automatic governor for rocking the frame to correspond with changes in the condition of the current of the machine, substantially as described.

4. In a dynamo electric machine, the governor, consisting of a solenoid and resistance in the main circuit, electro-magnets having a vibratory armature interposed between their opposite poles and connected, respectively, with the main circuit and with opposite contact-points, the solenoid-core being provided with an adjuster and contact-tongue for closing the circuit through either of the electro-magnets, substantially as described.

In testimony whereof I affix my signature in presence of two witnesses.

EDWIN PLACE.

Witnesses:
J. VANDENBURGH,
H. H. SMALL.